Inventors
H. H. L. Ritz
E. R. Elliott

July 12, 1966  H. H. L. RITZ ETAL  3,260,652
TUBULAR HEAT EXCHANGE ELEMENT
Filed Oct. 25, 1956  2 Sheets-Sheet 2
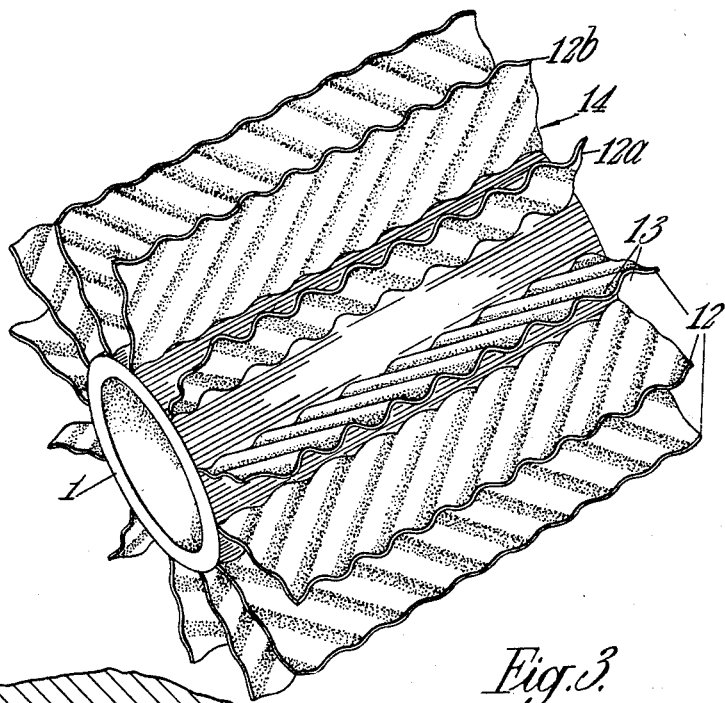
Fig. 4.
Fig. 3.
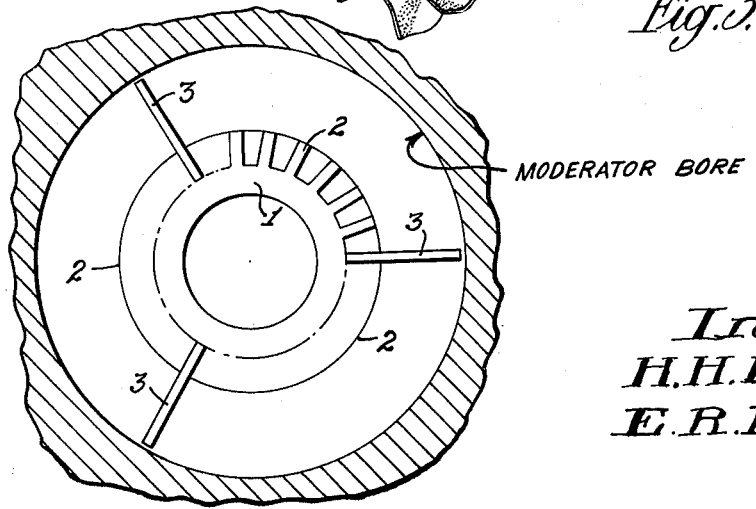
MODERATOR BORE
Inventors
H.H.L.Ritz
E.R.Elliott

United States Patent Office 3,260,652
Patented July 12, 1966

3,260,652
TUBULAR HEAT EXCHANGE ELEMENT
Heinrich Hugo Ludolf Ritz and Edward Rae Elliott, Newcastle-upon-Tyne, England, assignors to C. A. Parsons & Company Limited, Newcastle-upon-Tyne, England
Filed Oct. 25, 1956, Ser. No. 618,258
Claims priority, application Great Britain, Oct. 25, 1955, 30,488/55; Apr. 11, 1956, 11,077/56
5 Claims. (Cl. 176—81)

This invention relates to means for improving heat transfer between a surface and a fluid and is particularly applicable to surfaces which are to be heated or cooled by a flow of fluid over the said surface.

One application of the invention is in nuclear reactors in which nuclear fuel is surrounded by a container the outer surface of which is cooled by a fluid which is circulated through the reactor.

It is common practice to add fins to surfaces which are to be cooled or heated by a fluid so as to increase the heat transferred by increasing the surface area. The effectiveness of such a method depends among other things on the conductivity of the material of the fin, the additional resistance to flow of fluid which they produce and whether an efficient circulation of fluid can be achieved.

The object of the present invention is to improve the effectiveness of heat transfer between a surface and a fluid by using finned surfaces in such a way as to improve the circulation of the fluid.

The invention consists in means for effecting heat transfer between a surface and a fluid in which a surface has fins forming flow channels which are disposed at an angle to the main direction of fluid flow over said surface and baffle means arranged to deflect the fluid flowing in said flow channels the arrangement being such as to cause the fluid to flow in a helical path about an axis which is itself a helix.

Figure 1:
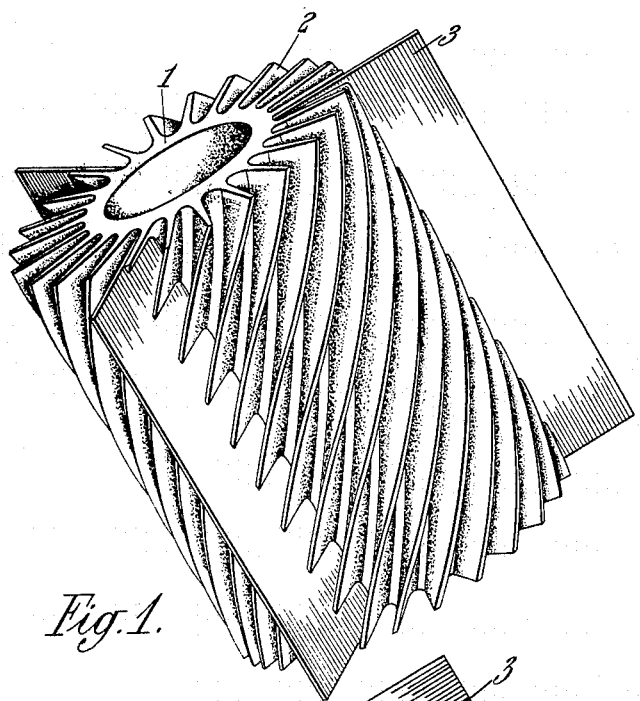
Figure 2:
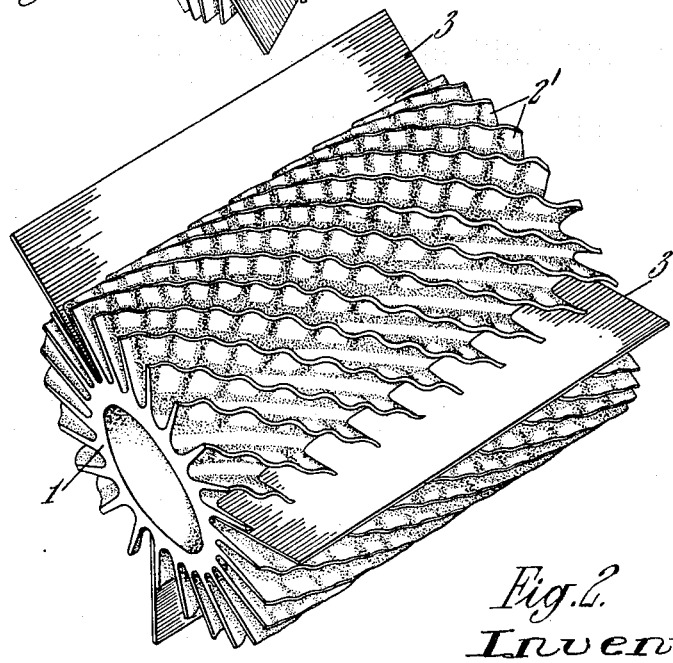

The invention also consists in means for effecting heat transfer substantially as described below with reference to the accompanying drawings in which:

FIGURE 1 shows a tubular heat exchange element in accordance with one form of the present invention the element having helical fins and longitudinal baffles, FIGURE 2 shows a tubular element in which the helical fins are corrugated, FIGURE 3 shows a tubular element the cylindrical surface of which is plane but to which are attached corrugated fins, FIGURE 4 is a plan view showing the element of FIG. 1 in a nuclear reactor bore.

In carrying the invention into effect in the forms illustrated by way of example and referring first of all to FIGURE 1, a tubular element is shown which is particularly suitable for use in nuclear reactors as a container for nuclear fuel.

Each element comprises a cylindrical container 1 for nuclear fuel which container has a finned outer surface. The fins 2 are disposed in helical fashion about the central axis of the container. A number of longitudinal strips or splitters 3 are then fitted to the container the strips being spaced equally round the circumference of the container.

These longitudinal strips 3 act as baffles in the flow channels formed between the fins 2 preventing the flow of fluid between the fins at these points.

The fuel elements are normally inserted in bores in moderating material in the reactor (as indicates in FIGURE 4) and are of smaller diameter than said bores to permit the passage of cooling gas therethrough. In the preferred form of the present invention the longitudinal strips extend in a radial direction beyond the fins to a position radially close to the surface of the moderating material when the element is in position in the reactor. The strips should be sufficiently close to the moderating material to prevent any substantial flow of cooling gas past the tips of the strips.

The effect of the arrangement is that cooling gas flowing in a generally axial direction with respect to the container is caused by the finned tube and the baffles to flow in a path which can most easily be described as a helical path the axis of which has been twisted into a helix. The gas on impact with a longitudinal strip is deflected along its surface radially outward and then into contact with the circular surface of the moderating material and is then deflected again by the surface of the next longitudinal strip, still following a helical path radially inward into channels between the fins disposed nearer the outlet end of the element. The overall effect is that there is a continual replacement of gas molecules in contact with the finned surface and the gas temperature near the surface approximates closely to the mean temperature of the gas. The fins 2 need not necessarily be on the surface which is in heat transfer relationship with the fluid; for example in a reactor the fluid for cooling the nuclear fuel may flow in a passage formed between a fuel container and moderating material and the fins may be arranged on the moderating material to give the desired flow effect.

The strips may be loosely fitted in slits in the fins 2 and fixed in position at each end or they may be joined to the tube 1. In the former case differential expansion is allowed for due to the loose fitting of the strips wilst in the latter case expansion can be allowed for by splitting up a strip into a number of short strips separated by a small gap.

Referring now to FIGURE 2 a tubular element 1 is shown similar to that in FIGURE 1 except that the fins now 2' are corrugated, the corrugations running in a substantially radial direction. The use of corrugations in this way assists the formation of a helical flow path for the fluid between the fins.

In the form shown in FIGURE 3 the tube 1 has attached to it a series of fins 12, 12a, 12b which extend in the direction of the longitudinal axis of the tube which is also the general direction of fluid flow over the surface of the tube. The fins are corrugated to form channels 13 on each side of the fin.

The corrugations and hence the channels are disposed in the same direction on either side of the fin and are inclined at an angle to the surface of the tube 1. Adjacent fins are so arranged that the channels on one fin are disposed in the opposite sense to those of the other fin as shown is the drawing.

Considering a cooling fluid flowing between two adjacent fins 12a, 12b in the general direction shown by an arrow 14 the effect is that the fluid will flow in a helical path down the channels in fin 12b towards the tube and in a helical path up the channels in fin 12a in a direction away from the tube. The fluid flow through the channels formed on either side of the fin 12b is towards the tube 1 whilst in 12a the flow through the channels formed on either side of fin 12a is away from the tube. This effect prevents any tendency for fluid flow over the tips of the individual fins.

If the finned tube is housed in a duct the bore of which is such that it encloses the fins for example when the tube is used in a reactor, the fluid will flow in a helical path through the channels of fin 12b, be deflected over the surface of the tube and then enter the channels of fin 12a flowing outwardly and then be deflected again by the wall of the bore into channels of fin 12b. The fluid is thus continuously advancing along the surface of the tube in a helical path in each channel about an axis which is of itself substantially a helix.

The result is that there is a continual change of fluid molecules in contact with the surface of the tube and this increases the heat transfer from tube to fluid. In this form of the invention the surface of the tube 1 acts as the baffle interrupting the flow of fluid through the channels in the fins.

Whilst the fins are shown as substantially parallel to the longitudinally axis of the tube they may themselves follow a helical path on the tube.

The fins may be bonded to the tube or the whole may be an integral extruded section. Another method is to form the fins from flat sheet which is then corrugated along its longitudinal edges leaving a flat space in the centre of the sheet. The corrugations are arranged at an angle to the edges of the strip. The edge portions of the strip are then bent through an angle to form radially extending fins whilst the flat central portion of the strip is curved to fit the periphery of the tube and is subsequently bonded thereto.

Whilst the channels 13 have been shown disposed in the same direction on either side of each fin they may be arranged so that the channels on one side of the fin are of opposite sense to those on the other side.

The channels on one side of a fin should be of opposite sense, however, to the channels facing them on an adjacent fin.

The materials used for the tubular elements and the longitudinal strips will depend upon the circumstances under which the elements operate. When used in a nuclear reactor for instance the material will need to have low-neutron absorbing properties, suitable materials being magnesium alloys or graphite.

In some cases it may be advisable to make the longitudinal strips 3 of FIGURES 1 and 2 of graphite when the element is used in a reactor, as graphite has low creep under operating conditions of the reactor, has sufficient compressive strength to restrain the element from bowing or buckling, is cheap and easily machined, and in view of the fact that the neutron moderating substance is often graphite the expansion coefficient of the strips and moderating material are identical. Further if a graphite strip should fracture the debris may be left in the reactor without affecting the operation of the reactor.

Whilst the use of the invention has been described with particular reference to nuclear reactors surfaces of the form described can be used in any heat exchange process wherein heat is to be transferred from a surface to a fluid.

In the case of the tubular element shown in FIGURE 1 the whole of said element, when used in a graphite moderated reactor, may be made of graphite.

We claim:

1. A tubular heat exchange element having fins which form flow channels for fluid flowing over the finned surface, said flow channels being obliquely disposed to the main direction of fluid flow over the said finned surface, baffle means interrupting the flow of fluid in said channels at intervals and deflecting the fluid out of the channels and into contact with a further surface associated with said finned surface which further surface re-directs said fluid into further flow channels which are disposed further along the element in the main direction of fluid flow, in which the fins are disposed on the outer surface thereof in helical fashion about the central axis of the element, the baffle means are constituted by longitudinally extending strips which extend in a radial direction beyond the tips of the fins and the said further surface is constituted by a containing surface surrounding the element.

2. A tubular heat exchange element having fins which form flow channels for fluid flowing over the finned surface, said flow channels being obliquely disposed to the main direction of fluid flow over the said finned surface, baffle means interrupting the flow of fluid in said channels at intervals and deflecting the fluid out of the channels and into contact with a further surface associated with said finned surface which further surface re-directs said fluid into further flow channels which are disposed further along the element in the main direction of fluid flow, in which longitudinally extending fins are arranged on the surface of the element and the fins have flow channels formed thereon which are obliquely disposed with respect to the main direction of fluid flow over the element, the element being associated with a containing surface which together with the surface of the tube serves to deflect the fluid out of the flow channels formed on the fins and to re-direct it into further flow channels disposed further along the fins in the main direction of fluid flow over the element.

3. A tubular heat exchange element as claimed in claim 2, in which the flow channels formed on one side of a fin are disposed in the same direction as those on the other side.

4. A tubular heat exchange element as claimed in claim 2, in which the flow channels are formed by corrugating the fins.

5. A fuel element for a nuclear reactor, said element being adapted for insertion in a bore in a core of the reactor through which bore a cooling fluid is circulated, which element comprises a tubular container for housing nuclear fuel, said container having helical fins formed on its outer surface, said fins forming flow channels which are interrupted by longitudinally extending strips spaced over the periphery of the tube, which strips deflect the fluid out of the flow channels and into contact with the surface of the bore, which surface re-directs it into further channels disposed beyond the first mentioned channels in the main direction of fluid flow through the bore.

References Cited by the Examiner

UNITED STATES PATENTS

| 1,715,378 | 6/1929 | Murray | 257—262.19 |
| 1,993,539 | 3/1935 | Anthony et al. | |
| 2,090,222 | 8/1937 | Neveu | 257—130 |
| 2,117,445 | 5/1938 | Niemchek | 257—262.20 |
| 2,347,957 | 5/1944 | McCullough | 257—262.18 |
| 2,492,932 | 12/1949 | Fausek et al. | |
| 2,596,642 | 5/1952 | Boestad | 257—6 |
| 2,863,815 | 12/1958 | Moore et al. | |

FOREIGN PATENTS

| 1,060,883 | 11/1953 | France. |
| 702,136 | 1/1954 | Great Britain. |

OTHER REFERENCES

National Carbon Company Bulletin-Catalog Section M–8000–D, Form No. CP–8M–7–47, pages 4 and 5, July 1947.

Nucleonics, June 1955, vol. 13, No. 6, page 93.

LEON D. ROSDOL, *Primary Examiner*.

H. BERMAN, ROGER L. CAMPBELL, WILLIAM G. WILES, CARL D. QUARFORTH, *Examiners*.

J. M. BELL, M. L. SUTHERLAND, V. G. GIOIA, R. C. LYNE, *Assistant Examiner*.